(12) United States Patent
Christensen

(10) Patent No.: US 8,784,919 B2
(45) Date of Patent: *Jul. 22, 2014

(54) METHOD OF PREPARING A TUBER

(76) Inventor: Stanley Christensen, Grace, ID (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/468,095

(22) Filed: May 10, 2012

(65) Prior Publication Data

US 2013/0122162 A1    May 16, 2013

Related U.S. Application Data

(63) Continuation-in-part of application No. 13/295,369, filed on Nov. 14, 2011, now Pat. No. 8,617,629.

(51) Int. Cl.
*A23L 1/216* (2006.01)

(52) U.S. Cl.
CPC ...................................... *A23L 1/216* (2013.01)
USPC ............................ 426/282; 426/284; 426/637

(58) Field of Classification Search
USPC .......................................... 426/282, 284, 637
See application file for complete search history.

(56) References Cited

U.S. PATENT DOCUMENTS

| | | | |
|---|---|---|---|
| 2,130,533 A | 9/1938 | Barton | |
| 3,057,732 A | 10/1962 | Conrad et al. | |
| 4,520,034 A | 5/1985 | Ishii et al. | |
| 5,128,210 A | 7/1992 | Housley | |
| 6,180,145 B1 | 1/2001 | Ricks | |
| 6,692,782 B1 | 2/2004 | Hayes-Jacobson et al. | |
| 8,343,564 B2 * | 1/2013 | Kerr et al. | ........................ 426/637 |
| 2003/0118698 A1 | 6/2003 | Lindsey | |

FOREIGN PATENT DOCUMENTS

| | | |
|---|---|---|
| DE | 3229363 | 2/1984 |
| EP | 152218 | 8/1985 |
| WO | 9107883 | 6/1991 |
| WO | 01-49136 A1 | 7/2001 |

OTHER PUBLICATIONS

Korean Intellectual Property Office, PCT Search Report and Written Opinion, dated Mar. 28, 2013, 9 pages, Republic of South Korea.

* cited by examiner

*Primary Examiner* — Lien T Tran
(74) *Attorney, Agent, or Firm* — B. Craig Killough; Barnwell Whaley Patterson Helms

(57) ABSTRACT

The present invention is a method of preparing a tuber for consumption, with the tuber having added food ingredients in the tuber. The tuber is thoroughly cooked. The tuber is frozen to provide rigidity about the skin of the tuber, while leaving a portion of the flesh unfrozen. A portion of the flesh of the tuber is removed either prior to or after cooking. The desired added food material is inserted through a hole in the skin and into the void where flesh of the tuber was removed. The tuber may then be completely frozen for later preparation and consumption.

21 Claims, 6 Drawing Sheets

US 8,784,919 B2

METHOD OF PREPARING A TUBER

This Application is a continuation in part of application Ser. No. 13/295,369 filed Nov. 14, 2011 now U.S. Pat. No. 8,617,629.

FIELD OF THE INVENTION

This invention relates to the processes for preparing manufactured foods products, and is more particularly directed to methods of providing tubers with additional food ingredients.

BACKGROUND OF THE INVENTION

Tubers are a common food product. There are thousands of recipes and methods for preparing tubers for consumption. Tubers such as potatoes and sweet potatoes are cooked for consumption, such as by baking or microwaving. It is common for consumers to split the skin of the tuber and add other food products to the tuber, such as butter, cheese, sour cream, chives, pepper, and many other dairy, meat and vegetable products.

There is a need for a method of preparation of tubers which will allow such food products to be inserted into the tuber with minimal disruption to the skin. The resulting product should be easy for the consumer to prepare for consumption. The process for producing the resulting tuber products should be capable of volume processing.

SUMMARY OF THE INVENTION

The present invention is a method of preparing a tuber for consumption, with the tuber having added food ingredients placed in an interior of the tuber. The tuber is thoroughly cooked. The tuber is frozen to provide rigidity about the skin of the tuber, while leaving a portion of the flesh unfrozen. A portion of the flesh of the tuber is removed before or after cooking. The desired added food material is inserted through a hole in the skin and into the void where flesh of the tuber was removed. The tuber may then be completely frozen for later preparation and consumption.

DESCRIPTION OF PREFERRED EMBODIMENTS

The present invention is useful for preparing tubers. It is anticipated that the primary utility of the present invention will be for the preparing of potatoes, but the invention has utility for any tuber that has an outside skin surrounding an edible material. For example, a potato has an outside skin, and edible material that is internal to the skin. The edible material is referred to herein as the "flesh" of the tuber. The preferred embodiments herein use a potato as an example, but other tubers may be used according to the method and process as set forth herein.

In one embodiment, the potato is first cooked. The potato is cooked sufficiently so that the flesh is softened for subsequent removal, disturbance and/or mashing of the flesh as described herein. The flesh of the tuber is hard before cooking, and is therefore resistant to being disturbed or mashed, but after cooking the flesh is softened and is easy to disturb or mash. Since, in some embodiments, the potato will be heated and additionally cooked after the food material is inserted into the potato, it may not be desirable to thoroughly cook the potato.

Figure 1:
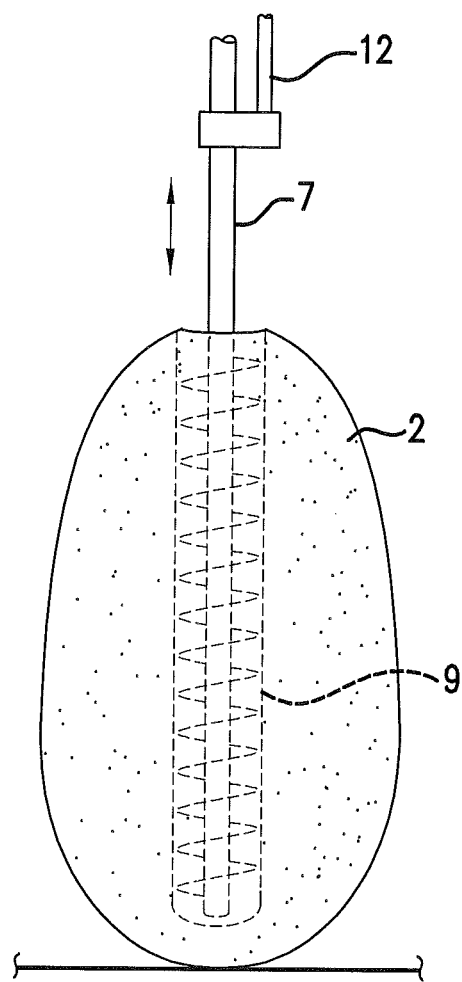
FIG. 1 shows removal of flesh from a potato.

In the embodiment shown in FIG. 1, a portion of the flesh of the potato is removed to form a void 9 in an interior of the potato. Removal of the flesh may occur prior to cooking, or in other embodiments, a portion of the flesh is removed after cooking the potato, or after flash freezing a portion of the potato as described herein. Removal of the flesh may be accomplished by an auger type device or auger 7 that augers out the flesh from an end of the potato. Other removal devices, such as a device that cut a plug from the potato and remove the plug may be used. The volume of flesh removed may approximate the volume of food material that will be inserted into the potato as described herein. The potato may be positioned generally horizontally, or vertically, as shown, or at other angles, during the flesh removal process.

Figure 2:
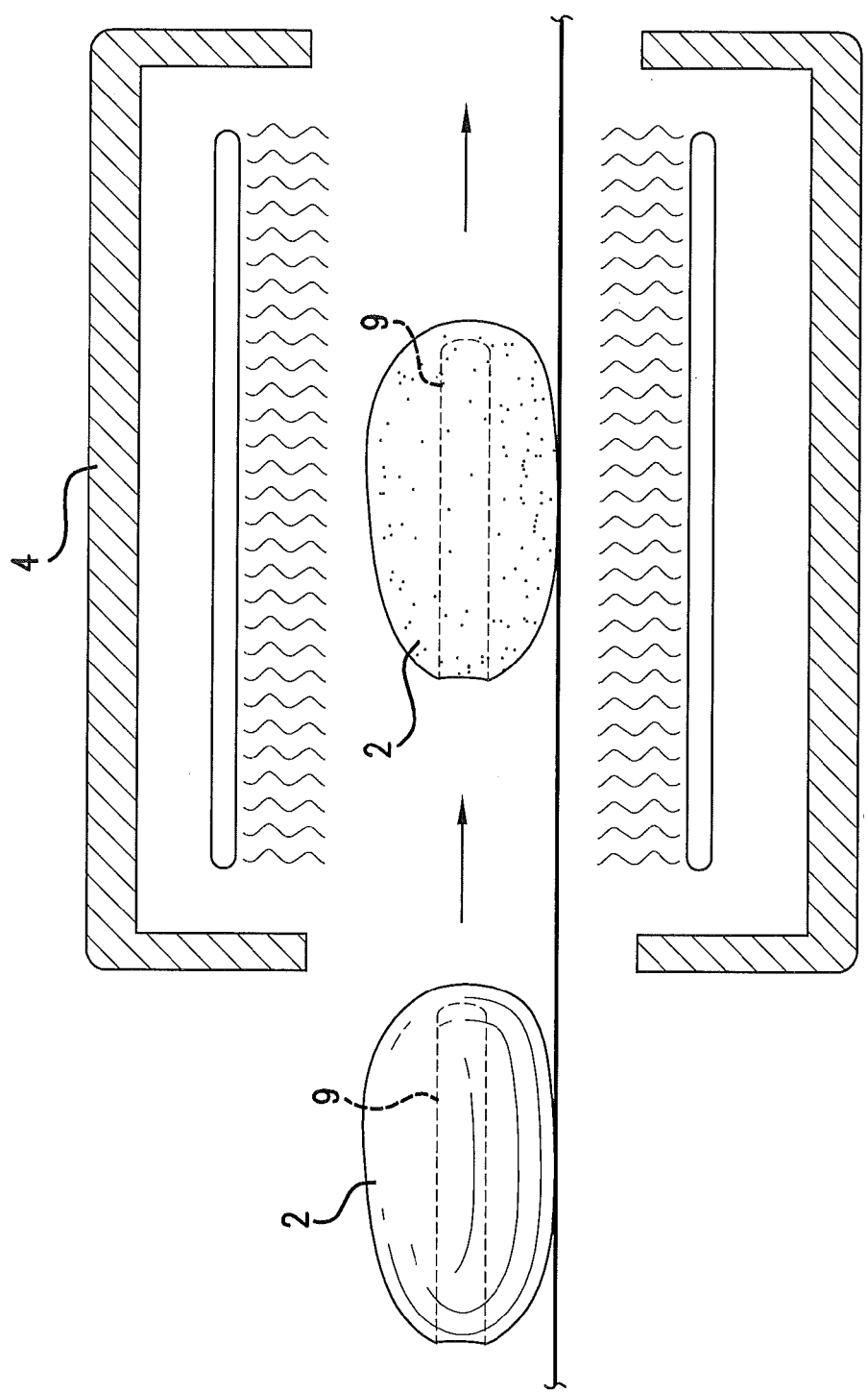
FIG. 2 demonstrates potatoes on a conveyor passing through an oven.

As shown in FIG. 2, in one embodiment, multiple potatoes 2 are placed on a conveyor that transports the potatoes through an oven 4. As the potatoes pass through the oven, they are cooked. The oven may be a microwave oven, or it may be an oven that uses resistance heating, steaming or other known methods of cooking or baking food items.

Figure 3:
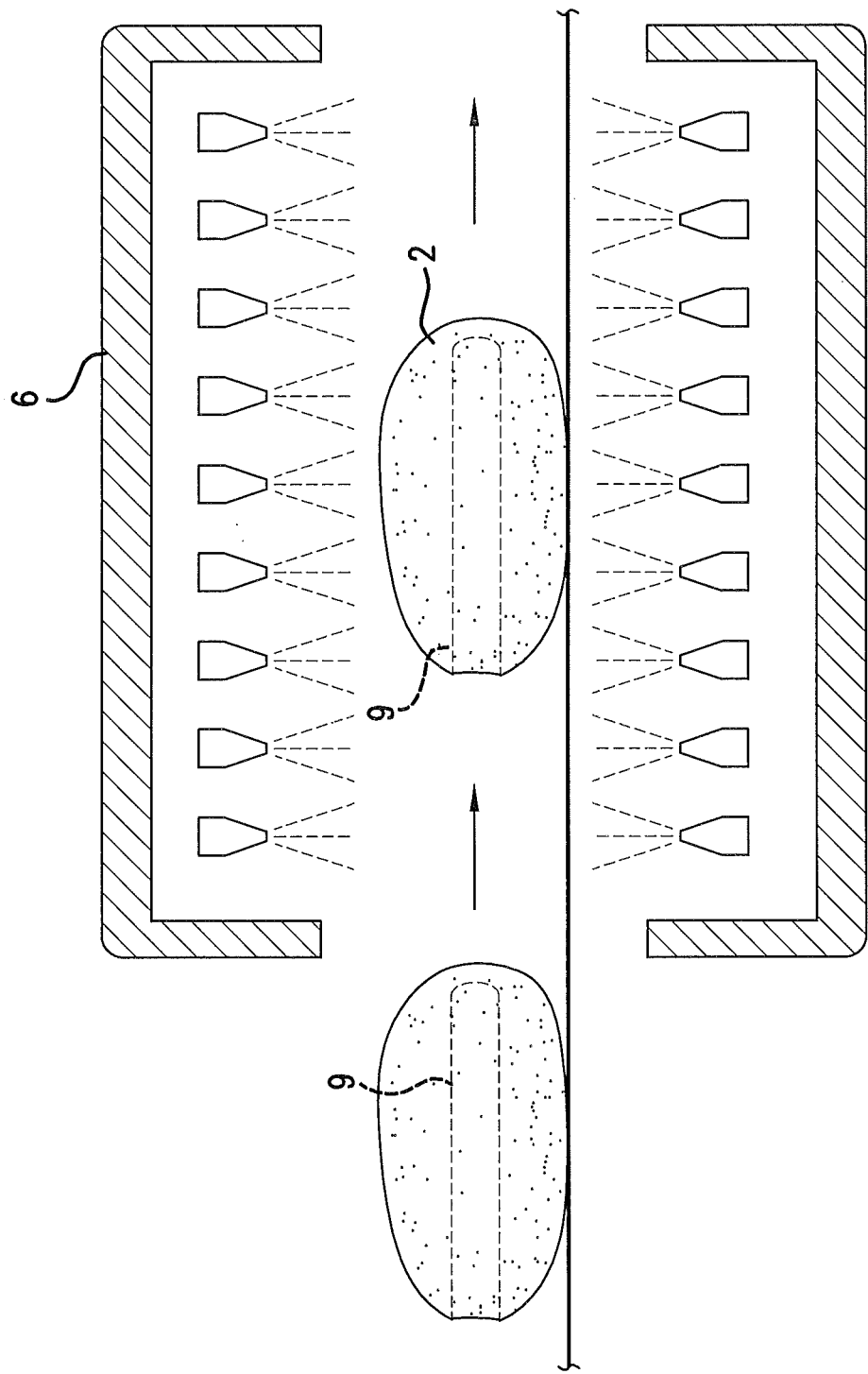
FIG. 3 demonstrates potatoes passing through a flash-freezing device.

After the potato is cooked, the skin of potato is frozen, such as by flash freezing. FIG. 3 demonstrates potatoes passing through a flash freezer 6. The skin of the potato is flash-frozen sufficiently to make the skin of the cooked potato firm. It is preferred that the skin of the potato is thoroughly flash-frozen, while leaving as much of the flesh of the potato soft from cooking as is possible. Freezing forms a hard outer shell that resists breaking the skin by rotation of the rotary tool inside the potato as described herein, while leaving the flesh soft for ease of mashing by the rotary tool.

Figure 5:
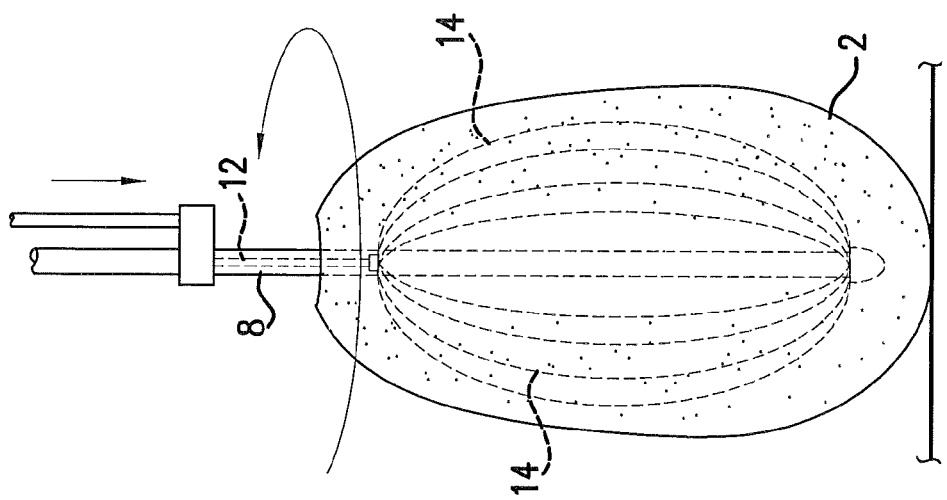
FIG. 5 demonstrates the rotary device as expanded, and rotating internally in the tuber to disturb the flesh of the potato.
Figure 4:
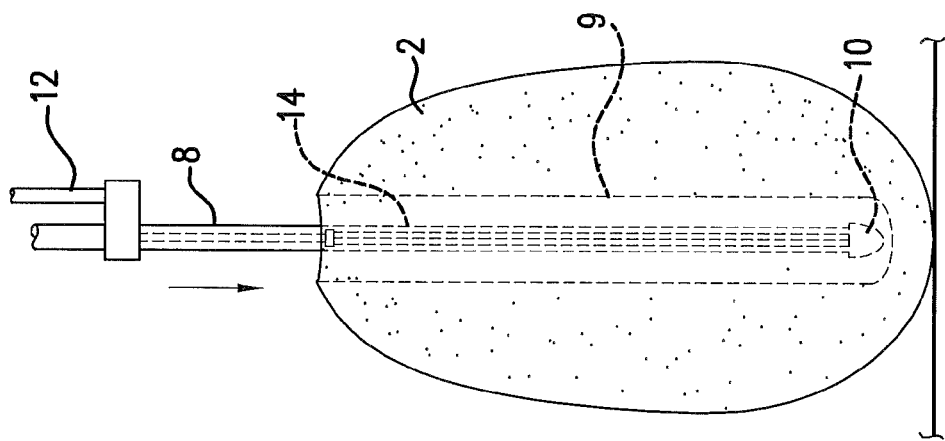
FIG. 4 demonstrates a contracted rotary device inserted through an end of a potato.

In some embodiments, the flesh of the potato is disturbed after cooking and flash freezing the skin. FIGS. 4 and 5 demonstrate an embodiment of disturbing or mashing the interior of the potato 2. A hole is formed in the skin of the potato while the skin remains frozen. The hole may be formed by a sharp end 10 of the rotary tool 8 as shown in FIG. 4. When used according to this embodiment, the rotary tool is inserted into an end of the potato, forming a hole in the end of the potato. The rotary tool is in a collapsed position so that the hole formed in the potato is substantially smaller than the maximum radius of the expanded rotary tool.

As demonstrated by FIG. 5, after the rotary tool is inserted into the potato, the rotary tool is actuated, and it rotates within the interior of the potato. The rotary tool disturbs the flesh of the potato, to mash the flesh of the potato. The flesh of the potato is soft and not frozen, while the skin of the potato remains frozen to resist breaking the skin.

In the embodiment shown, the rotary tool is expanded by a control rod 12 assembly that is advanced downwardly to force leaves 14 of the rotary tool outward. It may be necessary to begin rotating the rotary tool prior to forcing the leaves outward, since it is easier to force the leaves outward as the interior contents of the potato are progressively mashed by the tool. In a preferred embodiment, the rotary tool comprises metallic wires, such as wires formed of stainless steel, nitinol or other similar corrosion resistant metals. The wires are relatively thin, and are sufficient to disturb or mash the flesh of the potato, while being small enough to minimize resistance from the flesh of the potato.

In another embodiment, and without being bound by theory, the rotary tool may comprise leaves that expand outwardly due to centrifugal force from rotation of the device.

After the flesh of the potato is sufficiently disturbed, the rotary tool is collapsed and withdrawn from the potato, such as by retracting the control rod to collapse the leaves. Other food is injected into the potato through the hole formed in the end of the potato. The food material 16 is preferred to be liquefied, and/or pulverized and transported by a liquid carrier, such that the viscosity allows the material to be injected with sufficient force to penetrate from one end of the potato to substantially the oppose end of the potato, as demonstrated by FIG. 6.

Figure 6:
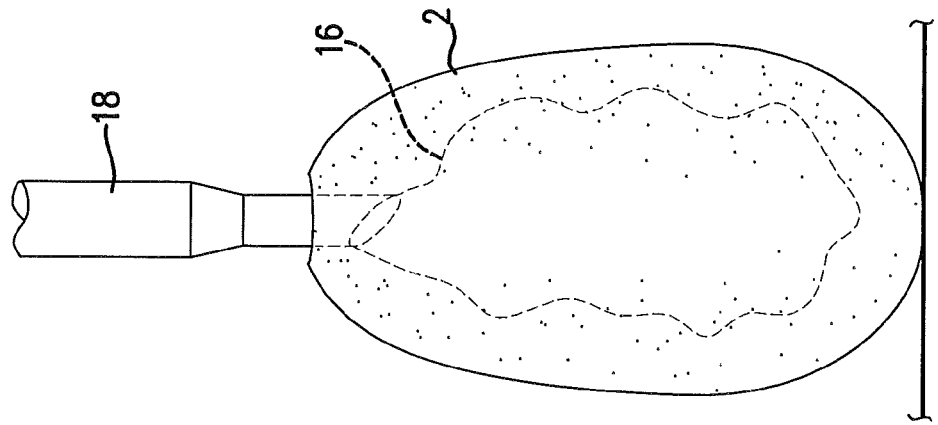
FIG. 6 demonstrates additional food being inserted into the potato.

One or more food materials are injected into the potato. In one embodiment, a flowable cheese product or similar flowable and edible material is injected into the hole, with the material injected at a sufficiently low viscosity and significant pressure and force to fill the potato from substantially one end to substantially the opposite end. In one embodiment, the material is injected by an injector 18 with the longitudinal of the axis of the potato being positioned vertically, as shown in FIG. 6, so that gravity assists in allowing the material to flow towards to the bottom of the potato, even in view of the resistance of the disturbed or mashed flesh. Maintaining the potato in this position even after the injector is removed may assist in allowing the contents to migrate toward the opposite end of the potato. The volume of the food that is inserted in preferred to be substantially the same as the volume of the flesh that is removed to form the void 9.

Figure 7:
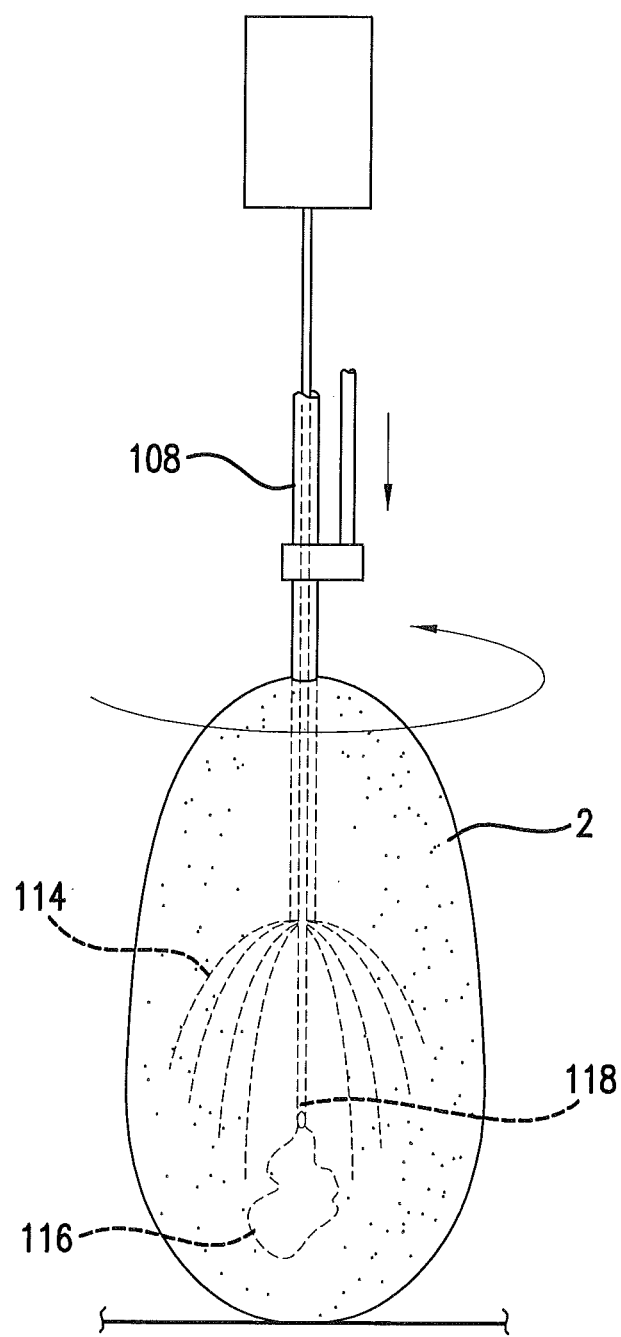
FIG. 7 shows an additional embodiment of the invention in which a device disturbs the flesh of a potato, injects a food material, and mixes the food material with the potato flesh.

FIG. 7 shows another embodiment of the invention. The device as shown in FIG. 7 pierces the skin of the flash frozen potato. Leaves 114 of a rotary tool expand to disturb the flesh of a potato. An injector 118 injects one or more food materials. The injector may have one or more orifices through which the food material is directed into the potato. The injector may be actuated as the device enters the top of the potato (as oriented in the drawing) and progressively moved downward to distribute the food product, and/or actuated as the device moves upward and within the potato. The rotary tool mixes the food material with the potato flesh. A single device as shown in this embodiment disturbs the flesh of the potato, injects the food material 116, and mixes the food material with the potato flesh. It is not necessary with this embodiment to insert multiple tools into the end of the potato to prepare the potato according to the invention.

The food materials that may be injected into the potato are substantially unlimited, but should be capable of being injected into the potato to substantially infiltrate the flesh of the potato. In another embodiment, food material is injected from both ends, and/or other voids formed in the skin of the potato for distribution of the food material relatively equally from end of the potato to the other. The food material that may be injected into the potato includes dairy, such as cheese, sour cream, and butter, as well as yogurt, meat products, vegetable products, and fungi, such as mushrooms. In some applications, it may be preferable to emulsify the food material.

After the additional food is injected into the potato, the potato may be further cooked, so that the skin is no longer flash-frozen. In a preferred embodiment, the potato is placed in a microwave oven and heated to bring the entire potato to a preferred consumption temperature, and, in the case of some added materials such as cheese, to melt the added material.

Figure 8:
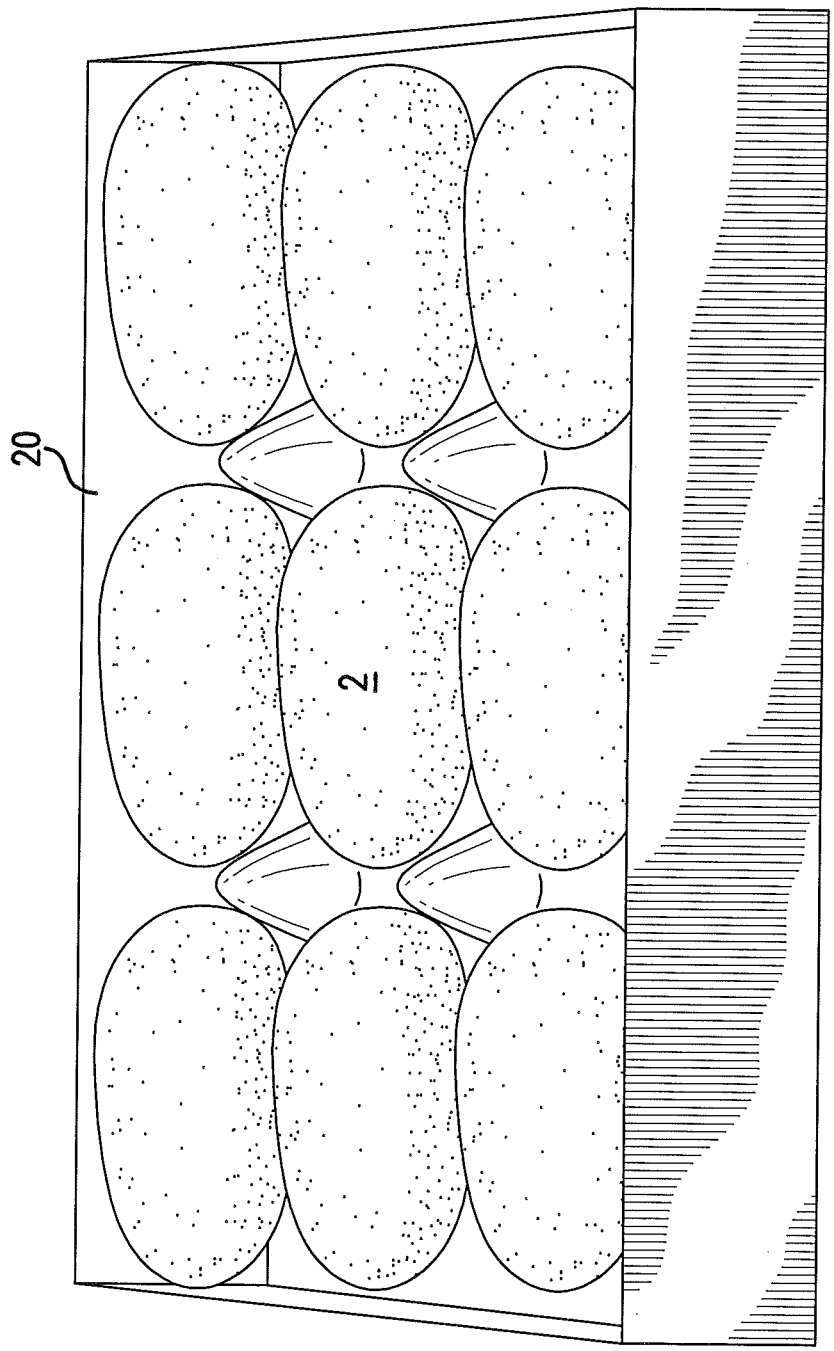
FIG. 8 demonstrates further packaging of potatoes prepared according to the invention.

In other embodiments, after the food material is inserted into the potato, the entire potato is frozen, with the flesh being frozen in addition to the skin of the potato. The frozen potato may then be packaged, either individually or in quantities as shown in FIG. 8. The frozen food products may then be shipped in packages 20 to distribution outlets, such as grocery stores. The frozen potato product produced according to the invention may be subsequently prepared by the consumer at a remote location.

In a preferred embodiment, the frozen potato according to the invention is prepared for consumption by microwaving the potato, but the resulting potato may also be heated to the desired consumption temperature by other known cooking and heating methods, such as baking, boiling or steaming.

What is claimed is:

1. A method of preparing a tuber, comprising the steps of:
   cooking a tuber, wherein the tuber comprises flesh that is surrounded by skin of the tuber;
   freezing the tuber for a time and at a temperature to freeze the skin of the tuber while not freezing a portion of the flesh of the tuber;
   piercing the skin of the tuber while frozen to form a hole in the skin;
   accessing the portion of the flesh of the tuber though the hole in the skin;
   removing flesh from the tuber to form a void within the portion of the flesh that is not frozen of the tuber; and
   inserting food into the void in the interior of the tuber.

2. A method of preparing a tuber as described in claim 1, further comprising the steps of inserting a rotating device through the hole in the skin of the tuber, and removing the portion of the flesh of the tuber by rotation of a rotating device.

3. A method of preparing a tuber as described in claim 1, further comprising the step of freezing the entire tuber after the food is inserted, and subsequently heating the skin and flesh of the tuber to above room temperature.

4. A method of preparing a tuber as described in claim 1, wherein the tuber is a potato.

5. A method of preparing a tuber as described in claim 1, wherein the food is not a food material from a variety of tuber.

6. A method of preparing a tuber as described in claim 1, wherein the food is in a flowable form, and is inserted into the flesh of the tuber under pressure.

7. A method of preparing a tuber as described in claim 1, further comprising the step of mixing the food within the interior of the tuber while the skin of the tuber is frozen.

8. A method of preparing a tuber as described in claim 1, wherein flesh is removed from the tuber to form a void within the interior of the tuber prior to cooking the tuber.

9. A method of preparing a tuber as described in claim 1, wherein flesh is removed from the tuber after cooking the entire tuber and while the skin is frozen.

10. A method of preparing a tuber as described in claim 1, wherein the volume of flesh removed to form the void in the interior of the tuber is approximately the same as the volume of food material that is inserted into the void of the tuber.

11. A method of preparing a tuber, comprising the steps of:
    removing flesh from a tuber to form a void in the flesh of the tuber, and subsequently cooking the tuber, wherein the tuber comprises flesh that is surrounded by skin of the tuber;

freezing the tuber for a time and at a temperature to freeze the skin of the tuber while not freezing a portion of the flesh of the tuber;

inserting food into the void in the flesh of the tuber; and disrupting the portion of the flesh of the tuber and mixing the food with the portion of the flesh of the tuber that is not frozen while the skin of the tuber is frozen.

12. A method of preparing a tuber as described in claim 11, further comprising the steps of inserting a rotating device into the flesh of tuber while the skin of the tuber is frozen, and wherein disrupting the portion of the flesh of the tuber is accomplished by rotation of the rotating device while the portion of the flesh of the tuber is unfrozen.

13. A method of preparing a tuber as described in claim 11, further comprising the steps of inserting a rotating device into the flesh of tuber while the skin of the tuber is frozen, and wherein disrupting the portion of the flesh of the tuber is accomplished by rotation of the rotating device, and wherein the rotating device is contracted during insertion of the rotating device into the flesh of the tuber and the rotating device is expanded for rotation of the rotating device in the flesh of the tuber, and the rotating device disrupts the portion of the flesh of the tuber while the portion of the flesh of the tuber is unfrozen.

14. A method of preparing a tuber as described in claim 11, wherein the step of freezing the skin of the tuber is performed by flash freezing.

15. A method of preparing a tuber as described in claim 11, further comprising the steps of freezing the tuber and the food after the food is inserted and the food is mixed with the flesh of the tuber, and subsequently heating the skin, the food and the flesh of the tuber to above room temperature.

16. A method of preparing a tuber as described in claim 11, wherein the tuber is a potato.

17. A method of preparing a tuber as described in claim 1, wherein the food that is inserted in the step of inserting food into the flesh of the tuber is not food from a variety of tuber.

18. A method of preparing a tuber as described in claim 11, wherein the food is in a flowable form, and the step of inserting food into the flesh of the tuber is performed with the food under pressure.

19. A method of preparing a tuber as described in claim 11, further comprising the steps of inserting a rotating device into the flesh of the tuber while the skin of the tuber is frozen, and wherein the step of disrupting the flesh of the tuber is accomplished by rotation of the rotating device, and wherein the food is mixed with the portion of the flesh of the tuber that is not frozen by rotation of the rotating device in the presence of the food and the portion of the flesh of the tuber that is not frozen while the skin of the tuber is frozen.

20. A method of preparing a tuber as described in claim 11, wherein disrupted flesh of the tuber that is disrupted during the step of disrupting the portion of the flesh remains in the tuber and is surrounded by the skin of the tuber when the step of inserting food into the flesh of the tuber is performed.

21. A method of preparing a tuber as described in claim 11, wherein the skin of the tuber is frozen when the step of inserting food into the flesh of the tuber is performed.

* * * * *